J. W. H. DEW.
PROCESS OF MANUFACTURING PNEUMATIC TIRE COVERS.
APPLICATION FILED DEC. 30, 1912.

Patented May 29, 1917.

Inventor:
J. W. H. Dew

Attorneys

UNITED STATES PATENT OFFICE.

JAMES WALTER HENRY DEW, OF LONDON, ENGLAND.

PROCESS OF MANUFACTURING PNEUMATIC-TIRE COVERS.

1,228,099.  Specification of Letters Patent.  Patented May 29, 1917.

Application filed December 30, 1912. Serial No. 739,406.

*To all whom it may concern:*

Be it known that I, JAMES WALTER HENRY DEW, a subject of the King of Great Britain and Ireland, and residing at 8 Laurence Pountney Hill, Cannon street, in the county of London, England, have invented certain new and useful Improvements in the Process of Manufacturing Pneumatic-Tire Covers, of which the following is a specification.

This invention relates to improvements in connection with the manufacture of pneumatic tire covers of the kind which are constructed of rubber and fiber in which no fabric or other woven or spun foundation is employed.

In such tires as hitherto constructed the compounding of the rubber and the fiber has been such that each single fiber cannot be secured to its neighbors or be thoroughly impregnated with the rubber or like solution with the result that the material of the tire cover is weakened due to the presence therein of faults, laminations or planes of cleavage along which the material has a tendency to split or burst.

Furthermore, the fibers have been arranged in the cover in such a manner that the driving strain upon the tire is taken up in an inefficient manner and the foundation of the cover also rapidly deteriorates owing to the fibers being forced apart by internal pressure.

The object of the present invention is to overcome this difficulty by providing a tire cover in the manufacture of which the single fibers have been treated as units so as to obtain the full strength of all the fibers used and the invention consists primarily in forming the tire cover from a number of strips of fiber and rubber or rubber-like substance which are approximately one fiber thick.

In the accompanying drawing which illustrates this improved process,

Figure 1:
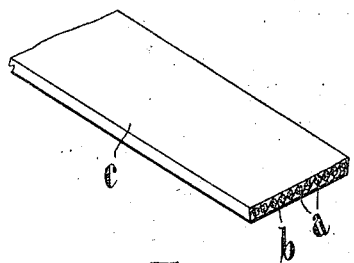
Figure 1 represents an enlarged perspective view of a portion of what may be termed the elementary strip.
Figure 2:
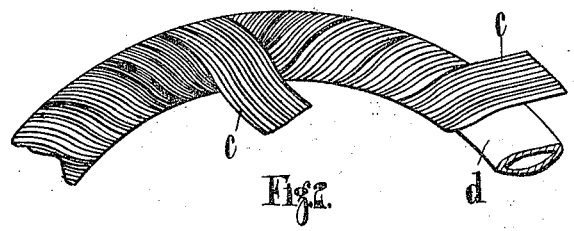
Fig. 2 is a side elevation showing the winding of the strips spirally to form the cover.

When building up a tire I take long suitable unspun fibers *a* either animal or vegetable such as rhea, ramie, china grass, flax, hemp cotton or the like, or horse, camel or other suitable hair or wool and after these have been suitably cleaned and dried from all residual moisture I cause them to be spread out into strips or sheets *c* approximately one fiber thick taking care to arrange these fibers so that they may be lying parallel to each other and overlapping in length when in position and in this form saturate them with a rubber solution *b*. Having saturated the fibers with rubber solution or with a solution of rubber-like substances and then covered them with an appreciable skin of rubber I place these strips on the tire core or mold *d* or wind them helically completely around the core or otherwise suitably arrange them preferably in such a manner that the fibers lie as nearly as possible when the tire is completed in the direction of the driving strain that is to be taken up by the tire, the slope of the helix being approximately about 45 degrees. I produce any desired thickness of material by superimposing the required number of basic strips or sheets *c* one upon the other taking care however that each alternate layer shall be laid in the reverse direction when the strips are wound helically in order that when the tire is in use there will be one set of fibers taking the driving strain on each edge of the tire irrespective of the direction in which the wheel may be driven and to prevent the fibers *a* from being forced apart in a direction transverse to their long axis by internal pressure.

When I have thus built up the main portion of each tire cover with fibrous strip I may add thereto the usual outer thickness of rubber or rubber compound securing this additional matter to the fibrous foundation by any usual method and I then vulcanize the whole together.

I do not limit the application of my invention to any particular form of mold or any special method of combining the fibers with the rubber-like solution and I modify the method of building up and arrangement of the alternate layers to suit the strength, form and shape of the particular type that is to be constructed.

Having now described my invention what I claim as new and desire to secure by Letters Patent is:—

1. A process for manufacturing tire covers which consists in forming a strip or sheet of unspun fibers laid parallel to one another in the direction of their length and approximately one fiber thick, impregnating said strip with liquid adhesive, superposing a plurality of said strips of fibers and adhesive spirally or helically relatively to the tire-forming member and vulcanizing said superposed strips.

2. A process for manufacturing pneumatic tire covers which consists in forming a strip or sheet of unspun fibers laid parallel to one another in the direction of their length and approximately one fiber thick, impregnating said strip with liquid adhesive, superposing a plurality of said strips of fibers and adhesive helically or spirally relatively to the tire-forming member adding to such superposed strip an outer cover of rubber and subsequently vulcanizing the whole.

In testimony whereof I have signed my name to this specification in the presence of two subscribing witnesses.

JAMES WALTER HENRY DEW.

Witnesses:
WILLIAM BARTON,
ETHEL BURN.